US006840154B2

(12) United States Patent
Mödinger et al.

(10) Patent No.: US 6,840,154 B2
(45) Date of Patent: Jan. 11, 2005

(54) WORKING CYLINDER

(75) Inventors: Uwe Mödinger, Wernau (DE); Dieter Waldmann, Ebersbach (DE)

(73) Assignee: Festo AG & Co., Esslingen (DE)

( * ) Notice: Subject to any disclaimer, the term of this patent is extended or adjusted under 35 U.S.C. 154(b) by 32 days.

(21) Appl. No.: 10/344,816

(22) PCT Filed: Jun. 15, 2002

(86) PCT No.: PCT/EP02/06622

§ 371 (c)(1),
(2), (4) Date: Feb. 14, 2003

(87) PCT Pub. No.: WO03/004881

PCT Pub. Date: Jan. 16, 2003

(65) Prior Publication Data

US 2003/0172806 A1 Sep. 18, 2003

(30) Foreign Application Priority Data

Jul. 3, 2001 (DE) ........................................ 201 10 965

(51) Int. Cl.[7] ................................................ F16J 10/00
(52) U.S. Cl. ........................................ 92/171.1; 92/5 R
(58) Field of Search ................................ 92/5 R, 171.1, 92/169.1

(56) References Cited

U.S. PATENT DOCUMENTS 4,086,456 A 4/1978 Bone
5,103,172 A * 4/1992 Stoll ........................... 92/5 R
5,167,182 A 12/1992 Sims
5,335,587 A * 8/1994 Stoll ........................... 92/5 R
5,732,613 A * 3/1998 Stoll et al. ..................... 92/5 R
6,089,111 A 7/2000 Machijima

FOREIGN PATENT DOCUMENTS

DE 2918294 C2 11/1979
DE 19925600 A1 12/2000

* cited by examiner

*Primary Examiner*—Edward K. Look
*Assistant Examiner*—Michael Leslie
(74) *Attorney, Agent, or Firm*—Hoffmann & Baron, LLP

(57) ABSTRACT

A drive cylinder comprising a cylinder barrel (3) extending between two cylinder heads (2*a* and 2*b*) and a plurality of ties (13) distributed about the outer periphery of the cylinder barrel (3) and bracing the cylinder heads (2*a* and 2*b*). Of these of ties at least one is constituted by a profile part (26) which extends in the peripheral direction (14) of the cylinder barrel (13) some distance along its outer periphery and whose profile provides means for the implementation of at least one additional function.

19 Claims, 2 Drawing Sheets

WORKING CYLINDER

This application is the National Stage of PCT Application No. PCT/EP02/06622 filed on Jun. 15, 2002 which claims priority to German Application No. 20110965.4 filed on Jul. 3, 2001.

FIELD OF THE INVENTION

The invention relates to a drive cylinder as is more especially employed in pneumatics or hydraulics.

BACKGROUND OF THE INVENTION

State of the art drive cylinders may comprise a cylinder barrel extending between two cylinder heads and designed in the form of a profile tube which owing to its profile renders possible certain additional functions, as for example the attachment of sensors in mounting grooves or the passage of actuating fluid through integrated ducts. In the special case of a design in the form of an aluminum extruded profile an extremely economic integration of numerous additional functions is possible.

Presently there is however the problem that cylinder barrels designed in the form of extruded profile parts may only be produced up to a piston size of approximately 125 mm in diameter at the most without running into substantial problems. In the case of larger diameters it is no longer possible to readily ensure the dimensional accuracy and the desired low degree of roughness of the piston engaging bore defined by the cylinder barrel to the desired degree. Consequently in the case of drive cylinders with a large piston diameter recourse is had to so-called tie rod cylinders in the case of which the cylinder barrel is smooth and circularly cylindrical and the cylinder heads are braced by rod-like ties distributed about the outer periphery of the cylinder barrel. The type of design does however involve high costs of production and requires technically complex features in order to provide for additional functions of the above mentioned type or indeed of any type.

SUMMARY OF THE INVENTION

One object of the present invention is to provide a drive cylinder more particularly in the form of a pneumatic cylinder, which even in the case of large diameters renders possible an economic integration of additional functions with a high degree of manufacturing precision.

This object is to be achieved by a drive cylinder comprising a cylinder barrel extending between two cylinder heads and a plurality of ties distributed about the outer periphery of the cylinder barrel and bracing the cylinder heads, of which ties at least one is constituted by a profile part which extends in the peripheral direction of the cylinder barrel some distance along its outer periphery and whose profile provides means for the implementation of at least one additional function (referred to as "additional function means" in the following).

The drive cylinder unites the possibilities of accurate manufacture as in the case of conventional tie rod cylinders with the possibility of economic integration of drive cylinders having a profiled cylinder barrel so that it is possible to speak of a hybrid cylinder. The cylinder barrel may have a geometry which is extremely simple to produce, and more particularly it may have a preferably circularly cylindrical configuration, at least one tie however not being designed in the conventional manner as a tie rod but as a specially profiled component (i.e. a profile part) which extends some distance along the outer periphery of the cylinder barrel and as regards its profile is so designed that additional function means are constituted, which permit the implementation of at least one additional function. Such an additional function may for instance be the attachment of sensors, of cylinder accessories and/or of the cylinder itself or be the provision of through channels for cables and/or hose and/or a drive fluid required for the operation of the drive cylinder to run through.

Further advantageous developments of the invention are defined in the dependent claims.

In accordance with needs there is the possibility of designing only several or all the ties as profile parts of the type described. A design has proved to be particularly advantageous in the case of which only two ties are present which are both in the form of profile parts, which assume diametrally opposite positions in relation to the cylinder barrel.

The peripheral extent of each profile part is conveniently so selected that the cylinder barrel is encircled along part of its periphery. More particularly, each profile part may have such a peripheral extent that it runs about at least 45° and preferably at least one 90° of the outer periphery of the cylinder barrel, a particularly convenient range of extent being between 90° and 180° of the peripheral extent of the cylinder barrel.

At the inner side facing the cylinder barrel at least one and preferably all profile parts have an inner face adapted to the curvature of the outline of the cylinder barrel, such adaptation being more particularly such that the radius of curvature of the inner face of the profile part is equal to or slightly larger than the radius of curvature of the cylinder barrel in the respective area.

In order not to impair an optimum relative position between the profile parts and the cylinder barrel during assembly and during operation, it may be an advantage for the respective profile part to be arranged at a certain small radial distance from the outer face of the cylinder barrel.

The drive cylinder may have particularly compact dimensions if at least one and preferably each profile part is made with an arcuate curvature in cross section, the concave part facing the cylinder barrel.

In order to ensure optimum bracing of the cylinder heads onto the cylinder barrel the length dimensions of the profile parts on the one hand and of the cylinder barrel on the one hand are preferably so matched that the profile part is arranged at an axial distance from the cylinder heads. The bracing action between the cylinder heads and the cylinder barrel is accordingly not obstructed by the profile parts.

It is particularly advantageous to have a design with at least one and preferably all profile parts in the form of extruded parts of aluminum material. However a design in the form of a molding, more particularly of plastic material, would also be possible.

In the following the invention will be explained with reference to the accompanying drawings.

DETAILED DESCRIPTION OF THE PREFERRED EMBODIMENTS

The drive cylinder generally referenced 1 is more particularly operated with compressed air as a drive fluid and accordingly finds application as a pneumatic cylinder. However, operation with a hydraulic actuating fluid would also be possible.

Figure 1:
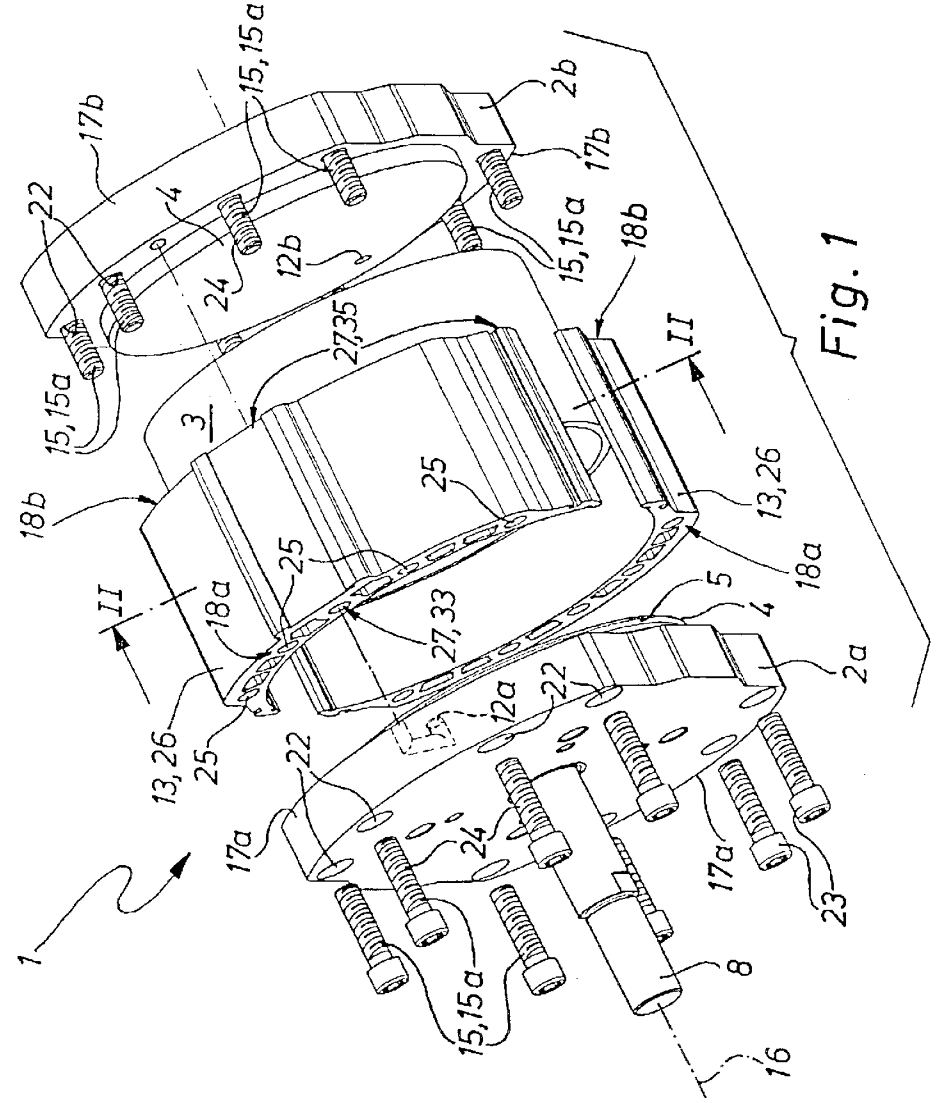
FIG. 1 shows a first design of the drive cylinder of the invention in a perspective exploded view.

The drive cylinder illustrated in FIG. 1 with shortened longitudinal dimensions possesses a spaced apart first and a second cylinder head 2*a* and 2*b*, between which a cylinder barrel 3 extends. The cylinder barrel 3 possesses a relatively simple form with a smooth outer face and a cylindrical configuration. Preferably, it is a question of a circularly cylindrical barrel 3.

Figure 2:
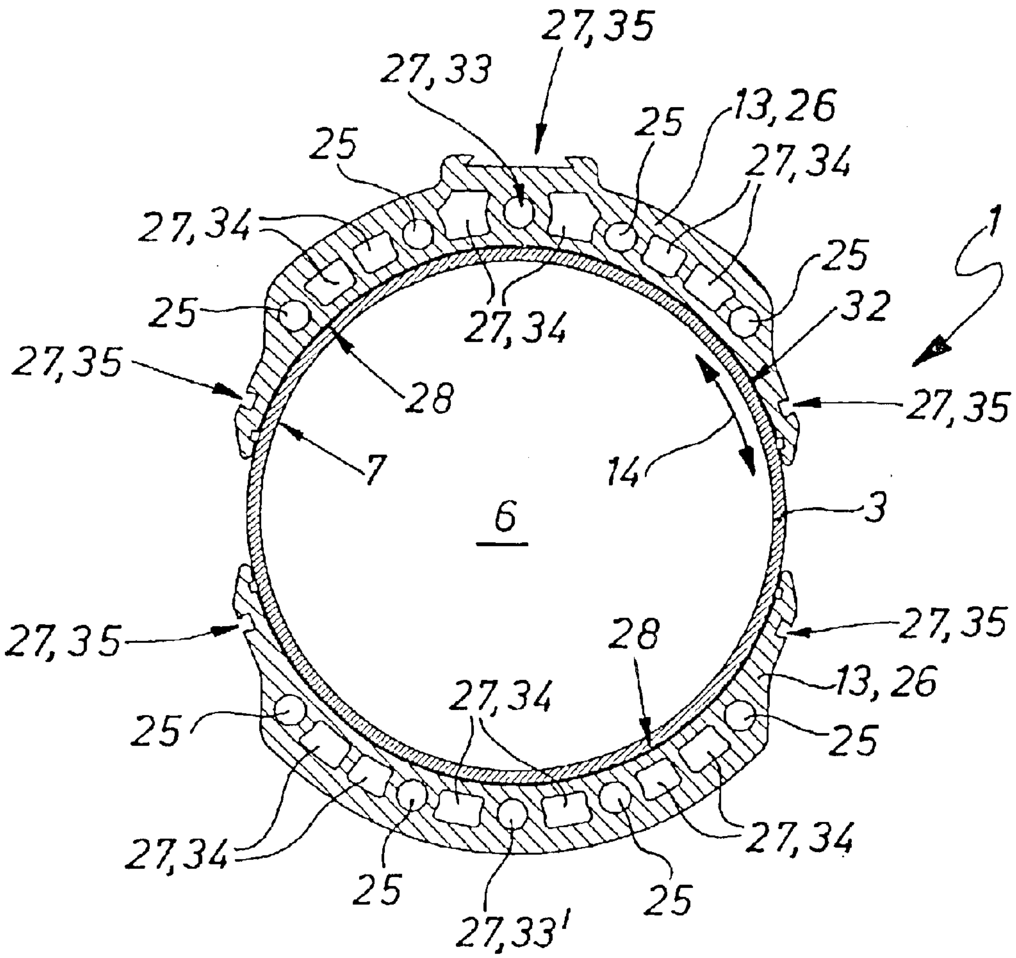
FIG. 2 represents a cross section taken through the drive cylinder of FIG. 1 on the cross section line II-II in the part with the cylinder barrel straddled by the profile parts.

As shown in FIG. 2 the cylinder barrel 3 preferably has the same wall thickness all around. In the case of the cylinder barrel 3 it is preferably a question of a metal tube.

The two cylinder heads 2*a* and 2*b* are essentially plate-like in design, but however have an axial projection 4 on the inner side facing the cylinder barrel 3, the outline of the projection 4 being adapted to the inner form of the cylinder barrel 3 so that the latter is able to be plugged at the end face onto the respectively corresponding axial projection 4. Accordingly there is an exact centering action between the cylinder heads 2*a* and 2*b* and the cylinder barrel 3 in the assembled state thereof.

In the working embodiment on the radially facing peripheral face each axial projection 4 possesses a peripheral groove having a sealing rings—this only being illustrated in FIG. 1 in conjunction with the first cylinder head 2*a* depicted on the left—and the sealing ring provides a fluid-tight sealing action between the cylinder barrel 3 and the respective cylinder head 2*a* and 2*b*.

The internal space 6 in the cylinder barrel 3 contains a piston, not illustrated in detail in the drawing, which by way of a seal arrangement is in hermetic contact with the inner face 7 of the cylinder head 3. The piston is able to move axially in relation to the cylinder barrel 3, the motion being transmitted to a power or force output member 8, which is accessible outside the cylinder barrel 4. In the working embodiment the power output member 8 is designed in the form of a piston rod, which extends through the first cylinder head 2*a* in a sealing manner to allow a sliding movement and in the inlet space 6 is kinematically coupled with the piston, which is not illustrated. The section of the power output member 8 placed outside the first cylinder head 2*a* may be connected. with any desired object to be moved.

The piston divides the internal station 6 into two axially following working spaces, in respect of which the supply and removal of the actuating fluid is possible. This takes place by way of a first and a second fluid duct 12*a* and 12*b*, which respectively open at one end by way of one of the cylinder heads 2*a* and 2*b* into the respective working space and at the other end lead to a connection opening which is not illustrated in detail, same being located on the outer side, opposite to the cylinder barrel 3, of the second cylinder head 2*b*. Fluid lines may be connected with the connection openings for the supply and removal of the actuating fluid.

By suitably controlled fluid actuation the piston may be the caused to perform an axial linear movement, which is available at the force transmitting member 8.

In order to ensure a firm axial connection together of the assembly comprising the two cylinder heads 2*a* and 2*b* and the cylinder barrel 3 the drive cylinder 1 is provided with a plurality of ties 13 arranged at the outer periphery of the cylinder barrel 3, there being an arrangement of the ties 13 distributed in the peripheral direction 14, indicated by the double arrow, of the cylinder barrel 3, the ties 13 extending respectively in axial parallelism to the cylinder barrel 3 between the two cylinder heads 2*a* and 2*b*. The ties 13 are respectively braced axially against cylinder heads 2*a* and 2*b*, something which is ensured by means of bracing elements 15, which in the working example are in the form of bracing screws 15*a*.

The dimensions, as measured athwart axis 16 of the drive cylinder 1, of the cylinder heads 2*a* and 2*b* are at least partially larger than the outer diameter of the cylinder barrel 3 so that the cylinder barrel 3 is radially overrun, the ties 13 being arranged between sections 17*a* and 17*b* of the cylinder heads 2*a* and 2*b*, which in the fashion indicated extend past the cylinder barrel 3. Accordingly the cylinder heads 2*a* and 2*b* have their sections 17*a* and 17*b* extending past the axially facing end faces 18*a* and 18*b* of a respective tie 13.

At the sections 17*a* and 17*b* projecting past the cylinder barrel 3 each cylinder head 2*a* and 2*b* is provided with a plurality of axial access holes 22, through which bracing screws 15*a* extend, the screw heads 23 bearing against the associated cylinder head 2*a* and 2*b*. The shanks 24 of the screws are screwed into aligned attachment holes 25 for the associated tie 13, such holes being open toward the respective end face 18*a* and 18*b*. The female threads in the attachment holes 25 are preferably tapped by the threaded shanks 24 on screwing in.

In the working embodiment the longitudinal dimensions of the ties are so matched to the length of the cylinder barrel 3 that when the cylinder heads 2*a* and 2*b* are firmly braced against end faces of the cylinder barrel 3 there is a small axial clearance between the ties 13 and at least one of the cylinder heads 2*a* and 2*b*. Accordingly it is possible to ensure that by bracing or tightening the ties 13 and the cylinder heads 2*a* and 2*b* the latter are firmly braced against the end faces of the cylinder barrel 3 and accordingly the cylinder barrel 3 is firmly clamped between the cylinder heads 2*a* and 2*b*.

Since the cylinder barrel 3 is seated on the axial projections 4 with a centering action, an alternative design would be possible where in the clamped or braced state the ties 13 would have their end faces 18*a* and 18*b* firmly thrust against the cylinder heads 2*a* and 2*b* and the cylinder barrel 3 would be held with a small degree of axial play between the cylinder heads 2*a* and 2*b*.

A particular feature of the ties 13 is that they are respectively constituted by a profile part 26, which extends some distance in the peripheral direction 14 of the cylinder barrel 3 along the outer periphery of this cylinder barrel 3, the selected type, owing to the selected type of profile, simultaneously forming the additional function means 27 being designed to perform at least one additional function. These integrated additional function means 27 render it possible for the ties 13 to be employed for other purposes besides their tie function.

The design of the ties 13 in the form of profile parts 26 in this context provides the advantage of a substantial degree of freedom as regards the design of the additional function means. This is more particularly the case when the profile parts 26, as in the working example, are in the form of extrudes of more especially aluminum material. By suitably designing the extrusion die profile parts may be produced which are highly adaptable as regards the respective application.

The design in the form of extrudes is as a rule to be preferred to a design, also possible in principle, as moldings, although in the case of plastic parts may be produced which lead to a considerable economy in weight.

The number of the profile parts 26 present and undertaking a tie function is in principle unrestricted, although it is convenient to have at least two such profile parts 26, as in the case in the working embodiment. An alternative structure, in the case of which the ties 13 are only partly in the form of profile parts and partly are in the form of rod-like ties, is not illustrated in the drawing in detail.

More particularly for reasons of symmetry the two profile parts 26 of the working embodiment are placed at diametrally opposite positions on the cylinder barrel 3 and respectively a peripheral extent in the direction 14 is selected which means that the cylinder barrel 3 is encircled respectively for part of its periphery by the respective profile part 26. The peripheral extent of the profile parts 26 is in the working example respectively in a range of 90° to 180° of the peripheral extent of the cylinder barrel 3. It is an advantage for the peripheral extent of a respective profile part 26 to be at least so large that it extends for at least 45° and preferably for at least 90° of the outer periphery of the cylinder barrel 3. Extremely compact dimensions of the drive cylinder 1 may be realized if the profile parts 13 are curved in an arcuate manner as seen in cross section, the concave portion being turned toward the cylinder barrel 3. Accordingly a configuration of the profile part 26 is possible in the case of which same directly follows the course of the periphery of the cylinder barrel 3.

This is further aided in the working example because the profile parts 26 have an inner face 28, at the concave inner side facing the cylinder barrel, with a curvature corresponding to the outline of the cylinder barrel 3. The radius of curvature of these inner faces is in the working example the same as that of the facing outer face 32 of the cylinder barrel 3, but may also be slightly larger than it, more particularly when the respectively profile part 26 is at a small radial distance from the outer face 32 of the cylinder barrel 3.

It will furthermore appear from FIG. 2 that when there are several profile part 26 the profile parts which are adjacent to each other in the peripheral, may be placed at a distance apart from each other. The facing section of the outer face 32, covered by the profile parts 26, of the cylinder barrel 3 may be limited to those areas, in which an additional function is to be made available.

As shown in FIG. 2 the profile parts 26 preferably generally are made thicker than the wall of the cylinder barrel 3. This renders it more particularly possible to achieve an integration of the additional function means 27 in the interior of a respective profile part 26.

In the working embodiment additional function means 27 are accordingly provided, which constitute a peripherally closed channel 33, which extends through one of the profile parts 26 in the longitudinal direction and opens at both end faces 18*a* and 18*b*. This channel 13 is a component of the first fluid duct 12*a*, through which the drive fluid may be pumped from the rear second cylinder head 2*b* to the front first cylinder head 2*a*.

A similar channel 33' is also present in the profile part 26, which however in the working embodiment is not utilized for fluid transfer.

As furthermore shown in FIG. 2 such parts of the material of the profile parts 26, which are not required for additional functions, may have one or more cavities 34 extending in the longitudinal direction, which for example economize in the use of material.

In other respects the cavities 34 may also be employed as channel-like additional function means and for example serve to accommodate electrical cables and/or hose, which are to be laid in the longitudinal direction of the cylinder barrel 3 and for example are employed in conjunction with sensor means.

In the working embodiment the profile parts 26 furthermore possess additional function means 27, which constitute attachment means 35. These attachment means 35 may more especially be designed in the form of attachment grooves or slots, which may be employed for the attachment of sensors and/or cylinder accessories and/or the drive itself.

For reasons of simplification of production of the profile parts 26 the desired attachment means 35 may be provided as required, different types of attachment means 35 being able to be realized simultaneously to be available for later use.

What is claimed is:

1. A drive cylinder comprising:

a cylinder barrel extending between two cylinder heads and a plurality of ties distributed about the outer periphery of the cylinder barrel and bracing the two cylinder heads, the plurality of ties are each constituted by a profile part which extends a distance in a peripheral direction of the cylinder barrel;

the plurality of profile parts are spaced from each other in the peripheral direction of the cylinder barrel, at least one of the plurality of profile parts on an inner side facing the cylinder barrel includes an inner face, and the inner face is adapted to the curvature of the outline of the cylinder barrel: and at least on of the plurality of profile parts provides means for implementation of at least one additional function.

2. The drive cylinder as set forth in claim 1, wherein two profile parts are diametrally oppositely arranged.

3. The drive cylinder as set forth in claim 1, characterized in that the peripheral extent of at least one of the plurality of profile parts is so selected that it embraces the cylinder barrel along a part of its outline.

4. The drive cylinder as set forth in claim 1, characterized in that the radius of curvature of the inner face of at least one of the plurality of profile parts is equal to or slightly larger than the radius of curvature of the cylinder barrel adjacent to the at least one profile part.

5. The drive cylinder as set forth in claim 1, characterized in that at least one of the plurality of profile parts is curved in an arcuate manner as seen in cross section, the concave side thereof being turned toward the cylinder barrel.

6. The drive cylinder as set forth in claim 1, characterized in that the longitudinal dimension of at least one of the plurality of profile parts on the one hand and of the cylinder barrel on the other hand are so matched to each other that between the at least one profile part and at least one of the two cylinder heads there is an axial clearance.

7. The drive cylinder as set forth in claim 1, characterized in that at least one of the plurality of profile parts is constituted by an extrude.

8. The drive cylinder as set forth in claim 1, characterized in that at least one of the plurality of profile parts is constitute by a molding.

9. The drive cylinder as set forth in claim 1, characterized in that at least one of the plurality of profile parts is manufactured of aluminum material or of plastic material.

10. The drive cylinder as set forth in claim 1, characterized in that at least one of the plurality of profile parts has such a peripheral extent that extends for at least 45° of the periphery extent of the cylinder barrel.

11. The drive cylinder as set forth in claim 10, characterized in that the peripheral extent of the at least one profile part is in a range of 90° to 180° of the peripheral extent of the cylinder barrel.

12. The drive cylinder as set forth in claim 1, characterized in that at least one of the plurality of profile parts extends over one or more cavities extending along the full length.

13. The drive cylinder as set forth in claim 1, characterized in that the additional function means constitute attachment means, which are provided in the form of one or more attachment grooves and which are provided for the attachment of sensors and/or the drive cylinder itself.

14. The drive cylinder as set forth in claim 1, characterized in that the additional function means constitute peripherally closed channels for fluid and/or cables and/or hose to run in.

15. The drive cylinder as set forth in claim 1, characterized in that the cylinder barrel is cylindrical.

16. The drive cylinder as set forth in claim 1, characterized by attachment holes open toward the end faces of the at least one of the plurality of profile parts, into which holes attachment screws acting on the associated cylinder heads are screwed.

17. A drive cylinder comprising:

a cylinder barrel extending between two cylinder heads and a plurality of ties distributed about the outer periphery of the cylinder barrel and bracing the two cylinder heads, at least one of the plurality of ties is constituted by a profile part which extends a distance in the peripheral direction of the cylinder barrel, the profile part provides means for implementation of at least one additional function, and a longitudinal dimension of the at least one profile part and a longitudinal dimension of the cylinder barrel are so matched to each other that between the profile part and at least one of the two cylinder heads there is an axial clearance.

18. A drive cylinder comprising:

a cylinder barrel extending between two cylinder heads and a plurality of ties distributed about the outer periphery of the cylinder barrel and bracing the cylinder heads, at least one of the plurality of ties is constituted by a profile part which extends a distance in the peripheral direction of the cylinder barrel, the profile part provides means for implementation of at least one additional function, and the additional function means constitute peripherally closed channels for fluid and/or cables and/or hose to run in.

19. A drive cylinder comprising:

two cylinder heads;

a cylinder barrel extending between the two cylinder heads; and at least two profile parts distributed about an outer periphery of the cylinder barrel and bracing the two cylinder heads, the at least two profile parts extend a distance in a peripheral direction of the cylinder barrel and the at least two profile parts are spaced from each other in the peripheral direction of the cylinder barrel, at least one of the at least two profile parts on an inner side facing the cylinder barrel includes an inner face, and the inner face being adapted to the curvature of the outline of the cylinder barrel.

* * * * *